Figure 1:
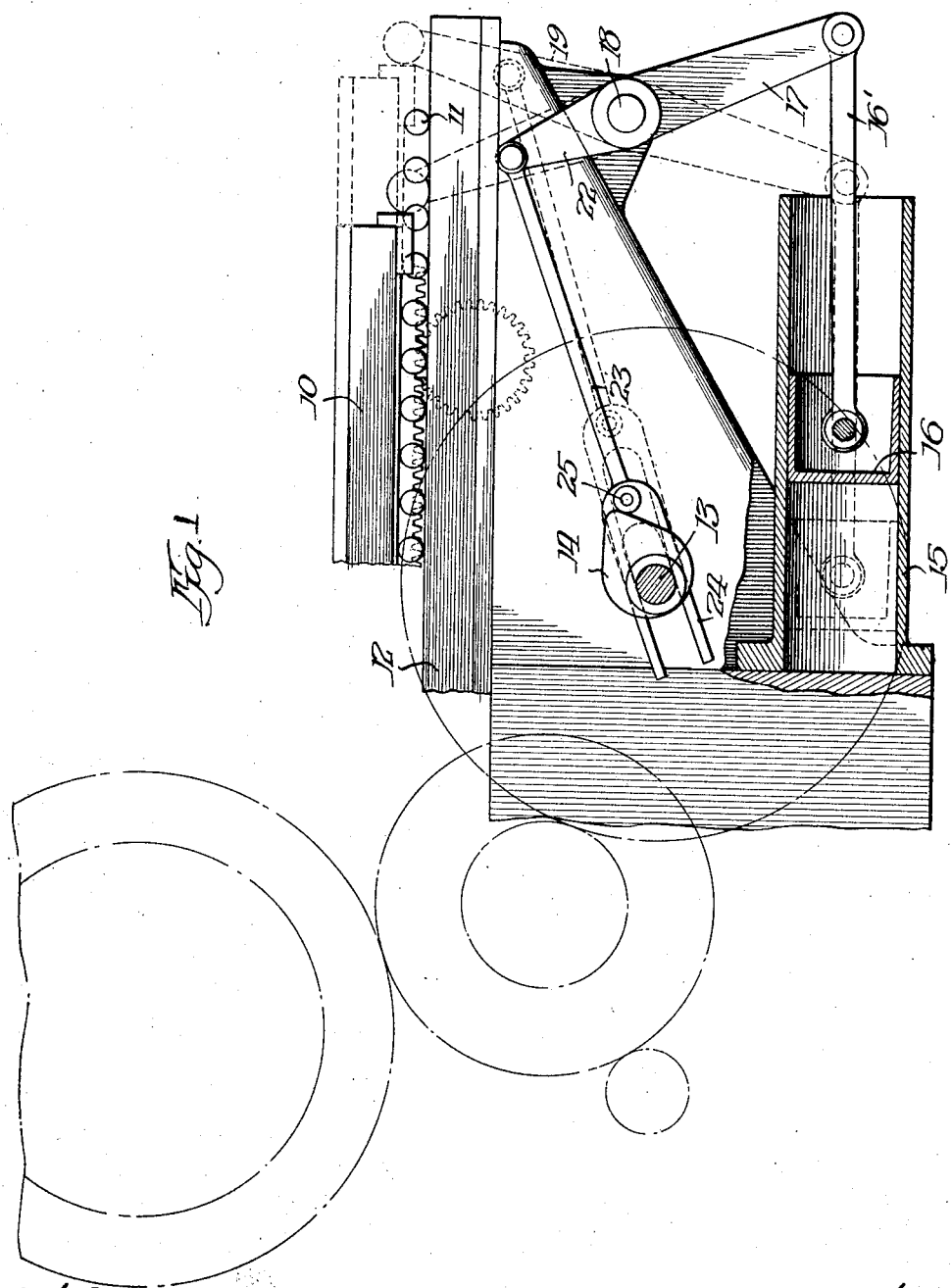

E. F. DUDLEY.
BUFFER FOR PRINTING PRESSES.
APPLICATION FILED APR. 23, 1917. RENEWED DEC. 5, 1917.

1,344,683.

Patented June 29, 1920.
2 SHEETS—SHEET 1.

Witnesses:

Inventor:
Edward F Dudley
By Wilkinson & Huxley
Attys.

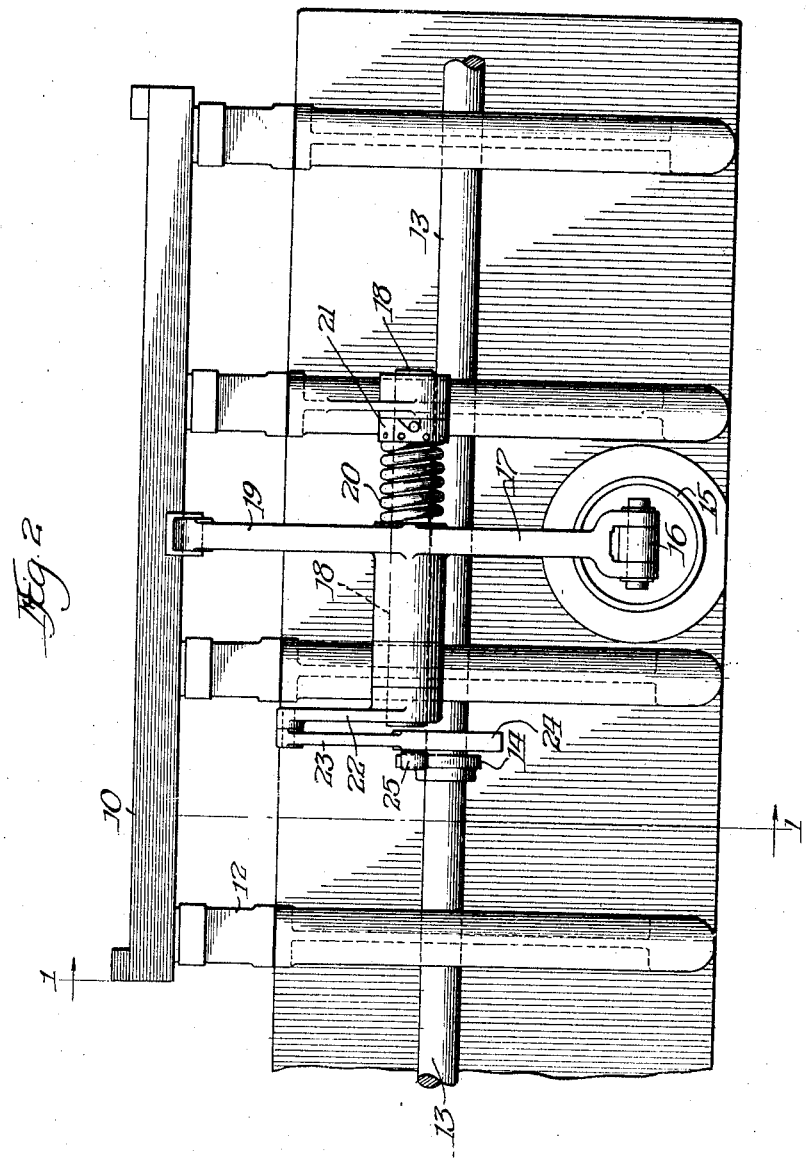

UNITED STATES PATENT OFFICE.

EDWARD F. DUDLEY, OF OAK PARK, ILLINOIS, ASSIGNOR TO THE MIEHLE PRINTING PRESS AND MANUFACTURING COMPANY, OF CHICAGO, ILLINOIS, A CORPORATION OF ILLINOIS.

BUFFER FOR PRINTING-PRESSES.

1,344,683.  Specification of Letters Patent.  Patented June 29, 1920.

Application filed April 23, 1917, Serial No. 163,833. Renewed December 5, 1917. Serial No. 205,669.

*To all whom it may concern:*

Be it known that I, EDWARD F. DUDLEY, a citizen of the United States, and resident of Oak Park, in the county of Cook and State of Illinois, have invented certain new and useful Improvements in Buffers for Printing-Presses, of which the following is a specification.

My invention relates generally to printing presses and similar devices having a relatively heavy reciprocating element, and it particularly relates to a buffer or shock absorber for use in connection with such devices.

In the operation of flat bed printing presses it has been found to be necessary to provide means for absorbing the shocks incident to the reversal of the bed. This has been performed in a number of different mechanisms all of which are open to the same objection; that is, the objectionable shock of contact between the motionless shock absorber and the rapidly moving bed. To provide a shock absorber of sufficient capacity, the elements of the shock absorber must be of substantial size and weight; thus the inertia of this mass cannot be overcome instantly without a shock.

An object in the present invention is to provide means in association with a reciprocating element whereby the inertia of the shock absorber elements is overcome and the parts caused to travel at substantially the speed of the reciprocating part before contact with the moving part. In this manner the shock heretofore experienced is entirely eliminated.

Another advantage is in the arrangement of the shock absorber elements in such position and relation to the frame that the forces are properly distributed and the tendency to racking or distortion is overcome.

The invention will be more readily understood by reference to the accompanying drawings, in which, Figure 1 is a side elevation partly diagrammatic in form and partly in section showing my invention as applied to a common form of flat bed press, and, Fig. 2 is an end view of the same.

In the drawings the reciprocating bed 10 is mounted upon suitable rollers 11 for reciprocation on the ways 12. Rotation is imparted to the shaft 13 in synchronism with the bed reciprocation, and on this shaft is fixed a cam 14 which performs the function of overcoming the inertia of the shock absorbing elements prior to contact with the flat bed. The buffer or shock absorber may comprise the air cylinder 15 within which the piston 16 is mounted. A connecting rod 16' extends between the piston and one arm 17 of a lever fulcrumed on a shaft 18 mounted on bearings on the frame. The upper arm 19 of the lever is so arranged that its extremity lies in the path of travel of the bed 10. As shown in Fig. 2 a torsion spring 20 is mounted on the shaft 18, one end of the spring being connected to the lever and the other end to a suitable tensioning device 21. The tendency of the spring is to cause the lever to assume the full line position of Fig. 1. Also secured to the shaft 18 for movement in unison with said lever is a crank 22, and to this crank is connected a rod 23 having a forked end 24, which engages the shaft 13. A pin 25 carrying an antifriction roll is secured near the forked end of the rod and coöperates with the cam 14.

The parts are shown in the position they will assume when the bed has reached a point near the end of its reciprocation and when the shock absorbing devices have been started in motion by the cam and the speed thereof increased to substantially that of the bed. During the completion of the cycle of operations, the cam 14 has no further function, as the bed is then in contact with the upper end 19 of the lever and will continue to travel to the dotted line position of the parts, whereupon it will be reversed and the energy stored in the cylinder 15 will be utilized to assist in effecting the beginning of the reverse movement.

The parts being mounted in substantially the center of the machine and at a point beneath the bed is advantageous and the shock absorbing action will take place without serious strains or distortion of the frame. It will be understood that while I have shown my improvement as applied to but one end of a press, in practice it will be applied to both ends, the shaft 13 being preferably employed as the actuating element for both shock absorbing elements. Obviously, also, the device is capable of much modification and I do not wish to be limited to the exact form shown and described.

I claim:

1. In a printing press, the combination of cushioning means, having capacity for travel in excess of that required to take up shocks, and means for effecting such excess travel and bringing the rate of travel up to substantially that of the moving part to be cushioned, substantially as described.

2. A reciprocating element in combination with means operative near the end of the stroke of the element for absorbing the shock caused by bringing the same to a stop, said means including an energy-storing device, and means for causing travel of the moving parts of the device to bring the same into substantial speed consonance with said element before coöperating with the same, substantially as described.

3. In a printing press, the combination of a reciprocating bed, a cushioning device having moving parts, and means apart from the bed for starting said parts in motion prior to engagement therewith by the bed whereby to reduce the shock of contact between the bed and cushioning device, substantially as described.

4. In a printing press, the combination of a bed, a cushion, a lever coöperating at one end with said cushion and at another end lying in the path of travel of said bed, and means acting in advance of contact between the bed and lever for imparting motion to said lever to bring the same to substantially the speed of travel of the bed, substantially as described.

5. In a printing press, the combination of a reciprocating bed, a buffer cylinder and piston, a lever connected to the piston, one end of the lever being arranged to be contacted by a part on said bed, and a cam for moving said lever and piston in the direction of travel of the bed in order to cause the lever to be moving at substantially the speed of the bed when the parts come in contact, substantially as described.

6. In a printing press, the combination of a reciprocating bed, a buffer cylinder and piston, a connection between the piston and bed, and a cam operating to start said piston in motion toward a cushioning position in advance of operative contact by the bed, substantially as described.

7. In a printing press, the combination of a reciprocating bed, a buffer cylinder and piston, a connection between the piston and bed, and means operating to bring said piston and connections up to substantially the speed of travel of the bed before the bed comes into operative engagement therewith, substantially as described.

8. In a printing press, the combination of a frame, a reciprocable bed, an air cylinder and piston, a lever mounted on the frame, said lever engaging said piston at one end and at the other end lying in the line of travel of said bed, and a cam for causing initial movement of said lever to overcome its inertia and for reducing the shock of contact between the lever and bed, substantially as described.

9. In a printing press, the combination of a movable element, and cushioning means therefor which is in motion before it comes into operative engagement with said movable element.

10. In a printing press, the combination of a movable element, and cushioning means therefor which is in motion before it comes into operative engagement with said movable element, the inertia of both of which are substantially the same when cushioning action takes place.

11. In a printing press, the combination of a movable element, and cushioning means therefor going through a cushioned action prior to its cushioning action on said movable element.

12. In a printing press, the combination of a movable element, and cushioning mechanism therefor including means under cushioned action before cushioning the movable element.

Signed at Chicago, State of Illinois, this 18th day of April, A. D. 1917.

EDWARD F. DUDLEY.

Witnesses:
ALVIN G. FISCHER,
B. D. STEVENS.